United States Patent [19]
Vazquez et al.

[11] Patent Number: 5,947,299
[45] Date of Patent: *Sep. 7, 1999

[54] HYDRAULIC REACTOR AND CLASSIFIER FOR SOLID PARTICLES WITH ULTRASONIC APPLICATION

[75] Inventors: Belisario Sanchez Vazquez; Jesus Gutierrez Bastida; Ulises Monter Valenzuela; Arturo Zamudio Guzman; David Rascon Chavez; Timoteo Pastrana Aponte; Salvador Garcia Garcia, all of Queretaro, Mexico

[73] Assignee: Servicios Condumex, Queretaro, Mexico

[ * ] Notice: This patent issued on a continued prosecution application filed under 37 CFR 1.53(d), and is subject to the twenty year patent term provisions of 35 U.S.C. 154(a)(2).

[21] Appl. No.: 08/953,382

[22] Filed: Oct. 17, 1997

[30] Foreign Application Priority Data

Oct. 18, 1996 [MX] Mexico ...................... 964952

[51] Int. Cl.[6] .............. B03B 5/66; B03B 1/00; B03D 5/60
[52] U.S. Cl. .................. 209/157; 209/1; 209/3; 209/208; 209/168; 209/172
[58] Field of Search ............ 241/1, 301; 209/3, 209/18, 208, 483, 503, 168, 172, 172.5, 173, 157

[56] References Cited

U.S. PATENT DOCUMENTS

| | | | |
|---|---|---|---|
| 562,053 | 6/1896 | Weinhold | 209/208 |
| 1,254,173 | 6/1918 | Terry | 209/168 |
| 2,714,956 | 8/1955 | Marston | 209/18 |
| 3,380,584 | 4/1968 | Fulwyler | 209/3 |
| 4,156,593 | 5/1979 | Tarpley | 241/1 |
| 4,156,644 | 5/1979 | Richard | 209/157 |
| 4,165,839 | 8/1979 | Kuwajima et al. | 209/173 |
| 4,883,603 | 11/1989 | Roggenstein et al. | 209/157 |
| 5,035,363 | 7/1991 | Somoza | 241/1 |
| 5,059,309 | 10/1991 | Jordan | 209/1 |
| 5,289,921 | 3/1994 | Rodrigo et al. | 209/3 |
| 5,392,924 | 2/1995 | Hume | 209/173 |

FOREIGN PATENT DOCUMENTS

| | | | |
|---|---|---|---|
| 1131790 | 12/1984 | U.S.S.R. | 209/3 |
| 1473854 | 4/1989 | U.S.S.R. | 209/172 |

*Primary Examiner*—William E. Terrell
*Assistant Examiner*—Joe Dillon, Jr.
*Attorney, Agent, or Firm*—Carmen Pili Curtis

[57] ABSTRACT

The present invention relates to a hydraulic reactor and classifier, with ultrasonic application for a continuous process of separation and recovering minerals or other type of materials or for the production of chemical compounds. It comprises a body of two main sections, an upper part and a lower part. The upper part comprises a container, a loading compartment, a lamella package, at least one ultrasound transducer package and a peripheral weir. The lower part comprises an inverted semi-pyramidal container having a square base, the square base attached to the upper part, at least one ultrasound transducer package at different location within the reactor to distribute the ultrasound effect all over the slurry flowing through the reactor, a nozzle for delivering a liquid or a gas. The final part comprises a pinch valve for discharging coarse particles as a slurry.

16 Claims, 1 Drawing Sheet

HYDRAULIC REACTOR AND CLASSIFIER FOR SOLID PARTICLES WITH ULTRASONIC APPLICATION

BACKGROUND OF THE INVENTION

Ultrasonic energy is applied to produce vibrations or pulses within particles and solid materials usually at frequencies that vary between 20 and 60 KHz, when the sound waves that are transmitted through liquids reach acoustic wavelengths of 7.5 cm to 0.015 cm (speed of sound in liquids: 5,000 feet/sec.=1,500 m/sec.).

The most important mechanism related to ultrasound interacting with solid materials immersed in a liquid phase is called cavitation; a process which forms bubbles loaded with gas. The dynamic actions caused by the expansion (negative pressure) and compression (positive pressure) of the acoustic waves when the sound passes through a liquid, cause the bubbles to collapse. The collapse of the bubbles, in the inner part of which there exists a high vacuum, generates energy through implosion or violent burst and cause the following effects:

1. It fractures the gangue matrix associated with the ore at the zones of lower resistance which is usually at the interfaces of the different compositions or components of the ore. The fracture liberates selectively fragile compounds from the ore without alteration, consequently increasing significantly, the diffusion speed of a leaching reagent. Gangue matrix means commercially worthless mineral matter in the ore. A leaching reagent is any reagent used for dissolution of a metal contained in an ore, and the dissolution is achieved by diffusion of leaching reagent through metallic particles until these are brought into solution. The acoustic forces are practically the principal force that fracture the particles, liberating the surface contaminants.

2. It produces heat in the form of hyperhot points that obviously increase the ore extraction as well as vapor dissolution with the new temperature gradient, thereby reducing the reaction time without diminishing the extraction percentage.

Thus, for instance, the U.S. Pat. No. 4,443,322 relates to a continuous process and device to separate hydrocarbons or oils from sand or clay particles, breaking the solids to particle sizes that can be suspended in water as carriers in such a way that such suspension can be pumped up through an inclined duct or separator, where the suspended particles are submitted to ultrasound vibrations within a range of 18 to 27 KHz.

Other techniques to separate hydrocarbon liquids and produce gases, such as methane, carbon dioxide, etc., applying ultrasonic methods to aqueous media, are known.

The application of ultrasound in a hydraulic reactor and classifier to effect a continuous and more efficient separation and recovery of desired materials, minerals or chemical compounds, however, has not been devised.

It is thus an object of the present invention to offer a separator and classifier reactor that can extract minerals of interest through the use of sound waves which utilize the differential solubility of the minerals, with frequencies within a range of 20,000 Hz to 10 MHz.

A further object of the present invention is to offer an equipment that cam work as a static classifier for solid particles, a flotation cell, a separator and a reactor for solid-liquid reactions where catalytic effect of chemical reactions and flotation is required.

There are three functions performed by the equipment: a) as a static classifier, which is explained in the invention; b) as a leaching reactor, in which it can extract values of interest from minerals through the use of sound waves, enhancing the differential solubility of mineral particles with different sizes; and c) as a flotation cell.

Hereinbelow, the present invention will be described according to the drawings of FIG. 1 in order to define the invention more clearly but, obviously without limiting its scope.

SUMMARY OF THE INVENTION

The claimed invention is a general solid particle hydraulic reactor and classifier, with ultrasonic application for a continuous process of separation and recovering minerals or other type of materials or for the production of chemical compounds. It comprises a body of two main sections, an upper part and a lower part. The upper part comprises a container, a loading compartment, a lamella package, an ultrasound transducer package and a peripheral weir. The upper part further comprises an automatic control element for overflow level and an automatic control system for density and pulp. The lower part comprises an inverted semi-pyramidal container having a square base, the square base attached to the upper part, ultrasound transducer packages at different locations within the reactor to distribute the ultrasound effect all over the slurry flowing through the apparatus, a nozzle for delivering a liquid or a gas and optionally a bubble generator for ore concentration by flotation process. A final part comprises a pinch valve for discharging coarse particles as a slurry. The equipment is designed to automatically control the pulp density, product level and flow.

DETAILED DESCRIPTION OF THE INVENTION

Figure 1:
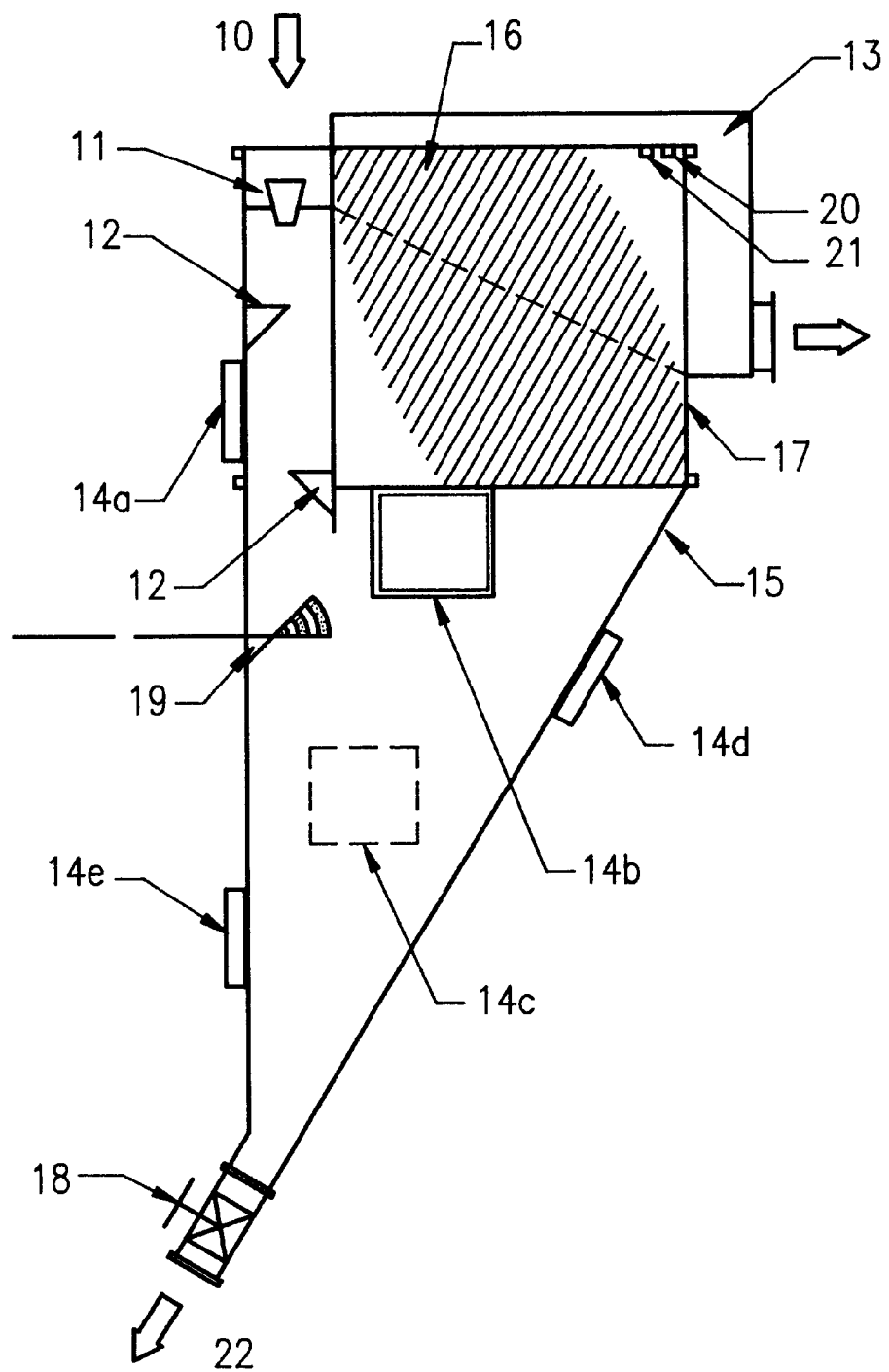
FIG. 1 is a side view of the hydraulic reactor and classifier with ultrasonic application.

The hydraulic reactor and classifier of this invention, hereinafter referred to as reactor, can be used as a separator, a classifier, a flotation cell, and reactor, if desired for solid-liquid reactions. The reactor classify solid particles suspended in water, solutions or any other liquid. The separation takes the advantage of the characteristic physical differences among the particles such as their size, density, form, proportion and the like, and the magnitude of the effects of gravity sedimentation, elutriation and ultrasound on them.

Crushing and grinding of ores are usually combined with the operation of classifying. Crushing and grinding of ores have always been characterized by their high cost because of the high energy consumption and wear and tear of the grinding-parts and devices. There exists a close relationship between crushing, grinding and classifying of the ores since a lowering of efficiency in any of them is immediately reflected in the other and consequently on the total efficiency of the system. The effect is multiplicative. Therefore, an optimum classification is desired because this has a direct influence in the total energy demand of the system to realize substantial savings.

Grinding is a unit operation usually performed on equipment called "mills" arranged inside comminution circuits used for ore dressing. In most cases, classification, operation is included after and/or before wet grinding unit operation, depending on circuit opportunities optimization.

The hydraulic reactor and classifier with ultrasonic application represents an alternative apparatus for classification of fine particle fractions to be installed for optimization within any comminution circuit involving unit operations of crushing, wet grinding and classification.

Overgrinding of the particles that have reached the liberation grade or the adequate fineness is eliminated owed to the effectiveness of the classifier of this invention before and/or after the mill which separates the fine particles as soon as they are generated without having to carry out an expensive and inefficient handling such as in the case with conventional classifiers, in which a great amount of fine particles are still present in the circulating and feed loads, because of the low efficiency of said equipments.

The hydraulic reactor and classifier of this invention can be used in all cases in which wet grinding of ores or solid materials in general is performed. The combination of gravity sedimentation, as well as, the ultrasound propagation coming from the ultrasound transducers 14 located as packages at different locations of the hydraulic reactor and classifier as shown in FIG. 1, and elutriation from nozzle 19 permit great versatility. Ultrasound propagation means the movement of ultrasonic waves from their source through the slurry on which the ultrasonic effect causes separation. Adapting an external bubble generator causes formation of hydrophobic particle concentrates through flotation. Through the controlled mixture of leaching reagents along with the feed, it is possible to accelerate the chemical dissolution reactions involved in hydrometallurgical and chemical processes as well.

The hydraulic reactor and classifier consists of two main parts, an upper part 17 and a lower part 15, the upper part comprising a rectangular or cylindrical container 17 where the feed 10 introduced through the loading compartment 11; a lamella package 16 for gravity classification by sedimentation; and, a peripheral weir 13 which is a sloping peripheral gutter around the tip of the upper part that works as a collector of fine material overflow.

The loading compartment 11 is a box that has baffle plates 12 underneath its location so that the latter can distribute the product in a uniform way as the feed falls from the loading compartment. Baffle plates act as mechanical barriers to avoid the channeling of the load or feed coming from the loading compartment. The baffle plates 12 are located just before and after the product has been exposed to the action of ultrasonic waves coming from ultrasound transducer 14a as shown in FIG. 1. When the load or feed falls from the loading compartment, it is impacted by more ultrasound waves coming from the other ultrasound transducers at the bottom of the rectangular container 14b, 14c, 14d, 14e. The lamella package 16 set inside the upper part of the reactor have tilted plates The lamella operates as a sedimentator with the advantage of having a lot of surface available for sedimentation because of the presence of tilted plates. The tilted plates decreases the length of sedimentation for the coarse particles so the ascendant countercurrent washing stream catches the dispersed ultrafine particles to be washed out. The separation occurs by sedimentation of coarse particles that are settled on the tilted plates faster than the fine particles which are still suspended and then washed off by the ascendant elutriation current. Once settled, the coarse particles are displaced by gravity from tilted plates towards the bottom. In addition, the tilted plates reduce the distance and time for sedimentation of the coarse particles and separate the washing ascendant stream, so the coarse particles are settled on the plates and are discharged by gravity. The ultrafine particles which are still suspended are washed by the ascendant washing stream and are discharged as overflow. Thus, the lamella works as a classifier by washing the ultrafine particles getting off as an overflow slurry. In this way, there is a combination of separation, cleaning, heating and even dissolution of particles so the big particles are liberated from the finest ones, which will permit their separation.

The lower part of the hydraulic reactor and classifier is an inverted semi-pyramidal container 15 that is, its square base attached to the upper part of the reactor, tapering downward, with the narrower opening at the bottom. In the lower part, the feed or the load now separated or liberated from the fine materials, is subjected to the action of additional ultrasound waves in order to obtain a second disengagement effect to supplement and intensify the first ultrasound impact on the feed. The ultrasound in the lower part of the reactor have variable frequencies (between 20–60 kHz) to cater to the wide ranges of particle sizes, volume, and mineralogical compositions of the ore, depending on specific application. As shown in FIG. 1, there are several ultrasound transducers along the particle path of the load or feed to ensure optimal washing and dissolution of the minerals or the desired compound. There is also a novel system for washing the feed or load through elutriation from liquid or gases coming from nozzle 19. Elutriation means separating lighter particles from heavier particles in a mixture by suspending the particles with a ascendant stream of liquid or gas, countercurrent from the settling of the particles, thereby carrying out the finest fractions of particles towards the overflow, on the peripheral weir.

The above process of gravity sedimentation, elutriation and ultrasonic propagation separates the fine particles from the coarse material. The particles of intermediate sizes, on the other hand, are liberated from the finest particles in the lamella package 16 and slide toward the lower part of the reactor, and because of the load current, they are dragged with the coarse particles towards the discharge located in the final section 18 of the lower pyramid having a pinch valve for discharging the coarse particles as a high percentage solids slurry. The reactor of this invention automatically controls the pulp density, product level and flow.

If the classifier reactor of this invention has a cylindrical or conical container in the upper part, the feeding is made through a central tube or column and the washing water is injected through an inner distribution cone and nozzle.

We claim:

1. A hydraulic reactor and classifier, with ultrasonic application for a continuous process of separating and recovering a slurry of materials comprising coarse and fine particles or for the production of chemical compounds by feeding said slurry into said reactor, comprising a hollow body filled with a fluid medium of water or leaching solution comprising two main sections:

a) an upper part comprising a rectangular container, a loading compartment, a lamella package, at least one ultrasound transducer package and a peripheral weir;

b) a lower part comprising an inverted semi-pyramidal container having a square base, the square base attached to the upper part, at least one ultrasound transducer package at different locations within the reactor to distribute an ultrasound effect all over said slurry of materials fed through the reactor; and a nozzle for delivering a liquid or a gas, said liquid miscible in said fluid medium.

2. The hydraulic reactor and classifier according to claim 1 wherein the material is introduced into the loading compartment.

3. The hydraulic reactor and classifier according to claim 1 wherein the lamella is adjacent to the loading compartment for classification of coarse particles through gravity.

4. The hydraulic reactor and classifier according to claim 1 wherein the peripheral weir on the edge of said upper part of the reactor collects the overflow of fine particles, once separated from the coarse particles, by displacing said fine particles through a lateral discharge from the rectangular container of said reactor.

5. The hydraulic reactor and classifier according to claim 1 wherein the at least one ultrasound transducer element is the bottom of the lamella package to break up fine particle conglomerates and separate the coarse particles from the fine particles.

6. The hydraulic reactor and classifier according to claim 1 wherein the at least one ultrasound transducer element in the lower part of the reactor provides an additional disengagement effect or reinforcement mechanical washing.

7. The hydraulic reactor and classifier according to claim 1 wherein the loading compartment comprises a baffle plate system that distributes the load in a uniform manner upon cascading just before said load is exposed to the action of ultrasound waves.

8. The hydraulic reactor and classifier according to claim 1 wherein the nozzle separates fine particles by injecting of water and/or washing solution by elutriation.

9. The hydraulic reactor and classifier according to claim 1, wherein the upper part comprises a lamella package to enhance the separation of coarse particles from fine particles.

10. The hydraulic reactor and classifier according to claim 1, wherein the ultrasound transducers assist in the dissolution of the particles by their differential solubility through a leaching process.

11. The hydraulic reactor and classifier according to claim 1 wherein the lower part further comprises an automatic control valve to selectively deliver the coarse particles.

12. The hydraulic reactor and classifier according to claim 1 wherein the upper part further comprises an automatic control comprising level and density sensors to control fluid overflow and density.

13. A method of separating a fine particles from a slurry of material comprising coarse and fine particles comprising the steps of:
   a) feeding a previously conditioned slurry material through a loading compartment of a hydraulic reactor and classifier having water or leaching solution therein;
   b) disengaging the fed material in a cascade path with baffle plates interposed alternatively down stream;
   c) subjecting the material to methods comprising:
      i) settling by gravity of coarse particles;
      ii) removing and disengaging fine particles from coarse particles by ultrasound propagation;
      iii) leaching the particles to assist in dissolution by their differential solubility;
   d) separating the fine particles by fluid injection through a nozzle in a lower part of the reactor; and
   e) discharging the fine particles in a peripheral weir on an edge of an upper part of the reactor.

14. The method according to claim 13 wherein ultrasound propagation is conducted by at least one ultrasound transducer element at the bottom of a lamella section by breaking up fine particle conglomerates and separating coarse particles from very fine particles.

15. The method according to claim 13 wherein the upper part comprises a lamella section to enhance the separation of coarse particles from fine particles.

16. The method according to claim 13 wherein ultrasound propagation is conducted at about 20 to about 60 kHz.

* * * * *